United States Patent
Inoue et al.

(10) Patent No.: US 9,061,730 B2
(45) Date of Patent: Jun. 23, 2015

(54) FRONT DERAILLEUR WITH CONTACT MEMBER

(75) Inventors: Kenkichi Inoue, Sakai (JP); Atsuhiro Emura, Sakai (JP); Kazuya Kuwayama, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 32 days.

(21) Appl. No.: 13/250,897

(22) Filed: Sep. 30, 2011

(65) Prior Publication Data
US 2013/0085025 A1   Apr. 4, 2013

(51) Int. Cl.
*B62M 9/134* (2010.01)
*B62M 9/136* (2010.01)

(52) U.S. Cl.
CPC ..................................... *B62M 9/136* (2013.01)

(58) Field of Classification Search
CPC ........................... B62M 9/136; B62M 9/1344
USPC .................... 474/80, 82; 242/615.3
See application file for complete search history.

(56) References Cited

U.S. PATENT DOCUMENTS

| | | | | |
|---|---|---|---|---|
| 4,078,444 A * | 3/1978 | Huret | | 474/82 |
| 4,479,787 A * | 10/1984 | Bonnard | | 474/82 |
| 4,551,121 A * | 11/1985 | Nagano | | 474/140 |
| 4,734,083 A * | 3/1988 | Nagano | | 474/78 |
| 5,171,187 A * | 12/1992 | Nagano | | 474/82 |
| 5,312,301 A * | 5/1994 | Kobayashi | | 474/80 |
| 6,009,771 A * | 1/2000 | Desenclos et al. | | 74/502.4 |
| 6,641,494 B1 * | 11/2003 | Campagnolo | | 474/80 |
| 6,902,503 B2 * | 6/2005 | Nanko | | 474/80 |
| 6,986,723 B2 * | 1/2006 | Valle | | 474/80 |
| 7,963,871 B2 * | 6/2011 | Peh et al. | | 474/82 |
| 2005/0272541 A1 * | 12/2005 | Valle et al. | | 474/80 |
| 2007/0191158 A1 * | 8/2007 | Ichida et al. | | 474/80 |
| 2008/0182689 A1 * | 7/2008 | Fujii et al. | | 474/82 |
| 2011/0183795 A1 * | 7/2011 | Emura et al. | | 474/80 |
| 2012/0295745 A1 * | 11/2012 | Emura et al. | | 474/80 |

FOREIGN PATENT DOCUMENTS

DE   34118874 A1   10/1984
FR   2518042 A1   6/1983

OTHER PUBLICATIONS

Extended Search Report issued on Jan. 28, 2013 in related European Appln. 12182919.6.

* cited by examiner

*Primary Examiner* — Michael Mansen
*Assistant Examiner* — Michael Riegelman
(74) *Attorney, Agent, or Firm* — Jeffer Mangels Butler & Mitchell LLP; Brennan C. Swain, Esq.

(57) ABSTRACT

A bicycle front derailleur that includes a main body and a chain guide operatively coupled to the main body. The chain guide includes a first plate, a second plate, and a contact member affixed to the first plate. The contact member includes a flexible portion that is adapted to flex when contacted by a chain running through the chain guide.

20 Claims, 4 Drawing Sheets

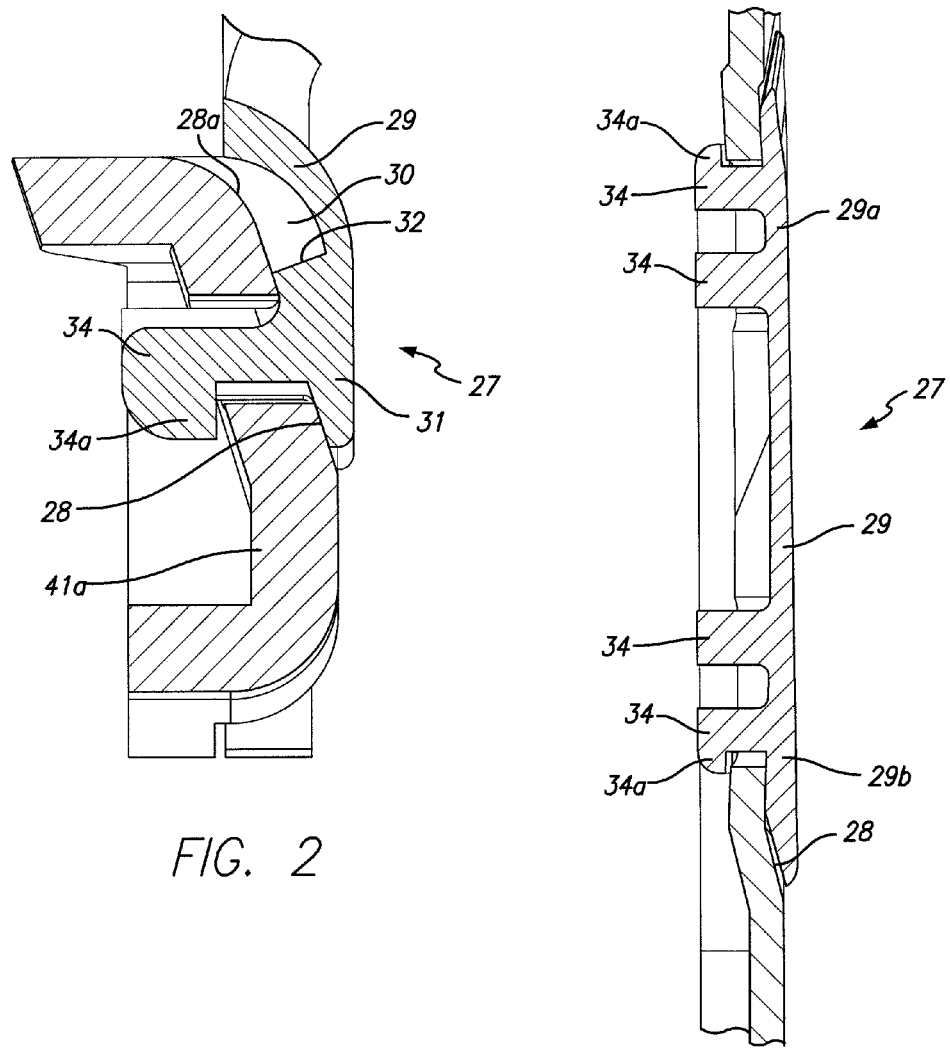

FRONT DERAILLEUR WITH CONTACT MEMBER

FIELD OF THE INVENTION

The present invention relates to a front derailleur for a bicycle that includes a contact member.

BACKGROUND OF THE INVENTION

Many bicycles include front derailleurs for shifting or moving the chain from one chain ring to another via a chain guide. The chain often rubs against the chain guide and makes a noise. Accordingly, a need exists for a derailleur with a chain guide that helps reduce the noise made when the chain rubs against the chain guide.

SUMMARY OF THE PREFERRED EMBODIMENTS

In accordance with a first aspect of the present invention there is provided a bicycle front derailleur that includes a main body and a chain guide operatively coupled to the main body. The chain guide includes a first plate, a second plate, and a contact member affixed to the first plate. The contact member includes a flexible portion that is adapted to flex when contacted by a chain running through the chain guide.

In a preferred embodiment, the first plate and second plate are laterally disposed. Preferably, the first plate is disposed close to the bicycle frame than the second plate when the bicycle front derailleur is attached to the bicycle frame. In a preferred embodiment, the contact member is detachable from the first plate. Preferably, the first plate includes a recessed portion in which the contact member is seated and a gap is defined between the recessed portion and the flexible portion. In a preferred embodiment, the flexible portion has a proximal portion and a distal portion, and the thickness of the proximal portion differs from the thickness of the distal portion. Preferably, the thickness of the proximal portion is thinner than the thickness of the distal portion.

The invention, together with additional features and advantages thereof, may be best understood by reference to the following description.

BRIEF DESCRIPTION OF THE DRAWINGS

FIG. 2 is a cross-sectional view of the contact member and inner plate of the bicycle front derailleur FIG. 1 taken along line 2-2 of FIG. 1;

FIG. 3 is a cross-sectional view of the contact member and inner plate of the bicycle front derailleur FIG. 1 taken along line 3-3 of FIG. 1;

DETAILED DESCRIPTION OF THE PREFERRED EMBODIMENTS

Figure 1:
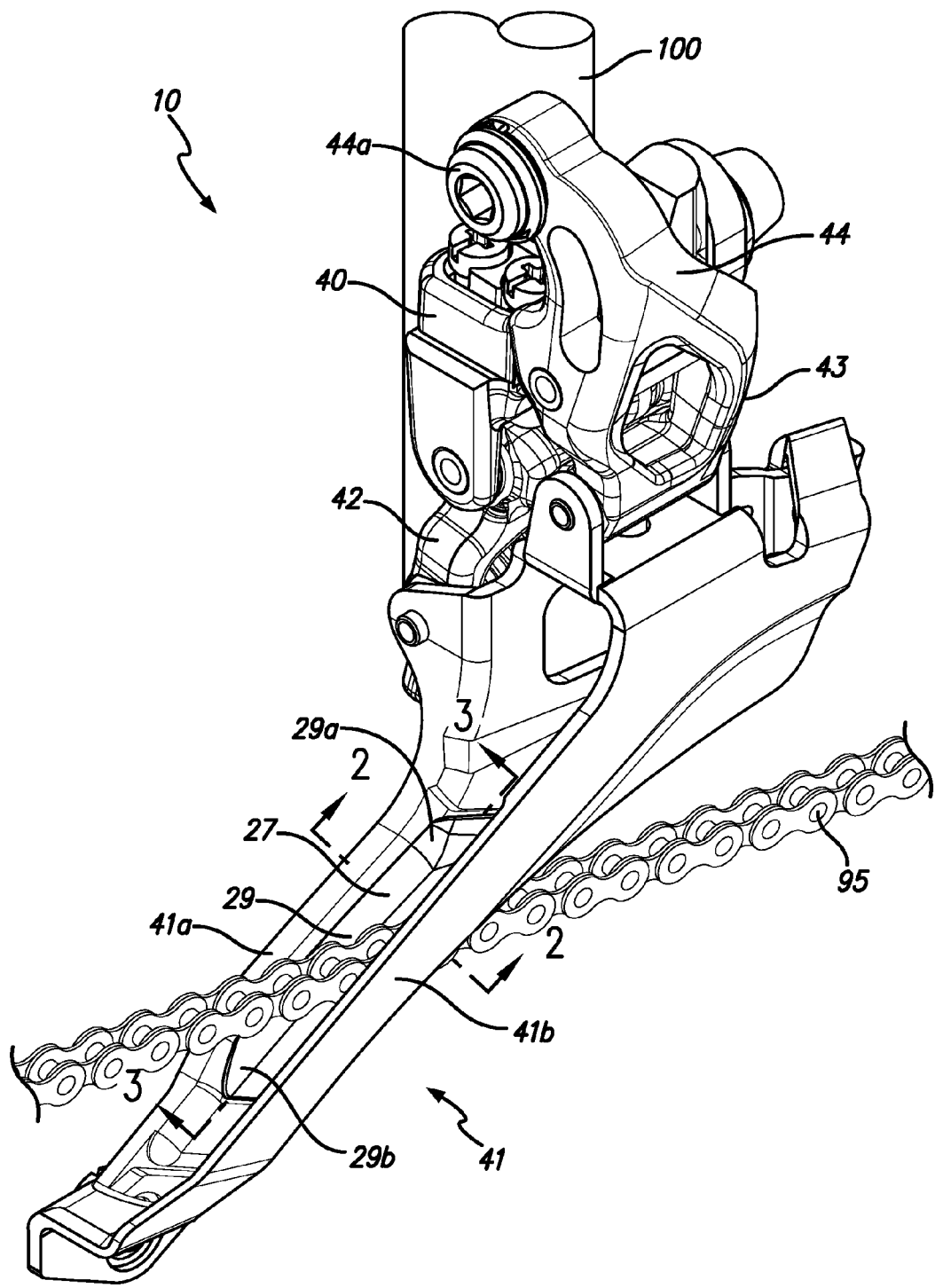
FIG. 1 is a perspective view of a bicycle front derailleur with a contact member in accordance with a first preferred embodiment of the present invention.
Figure 4:
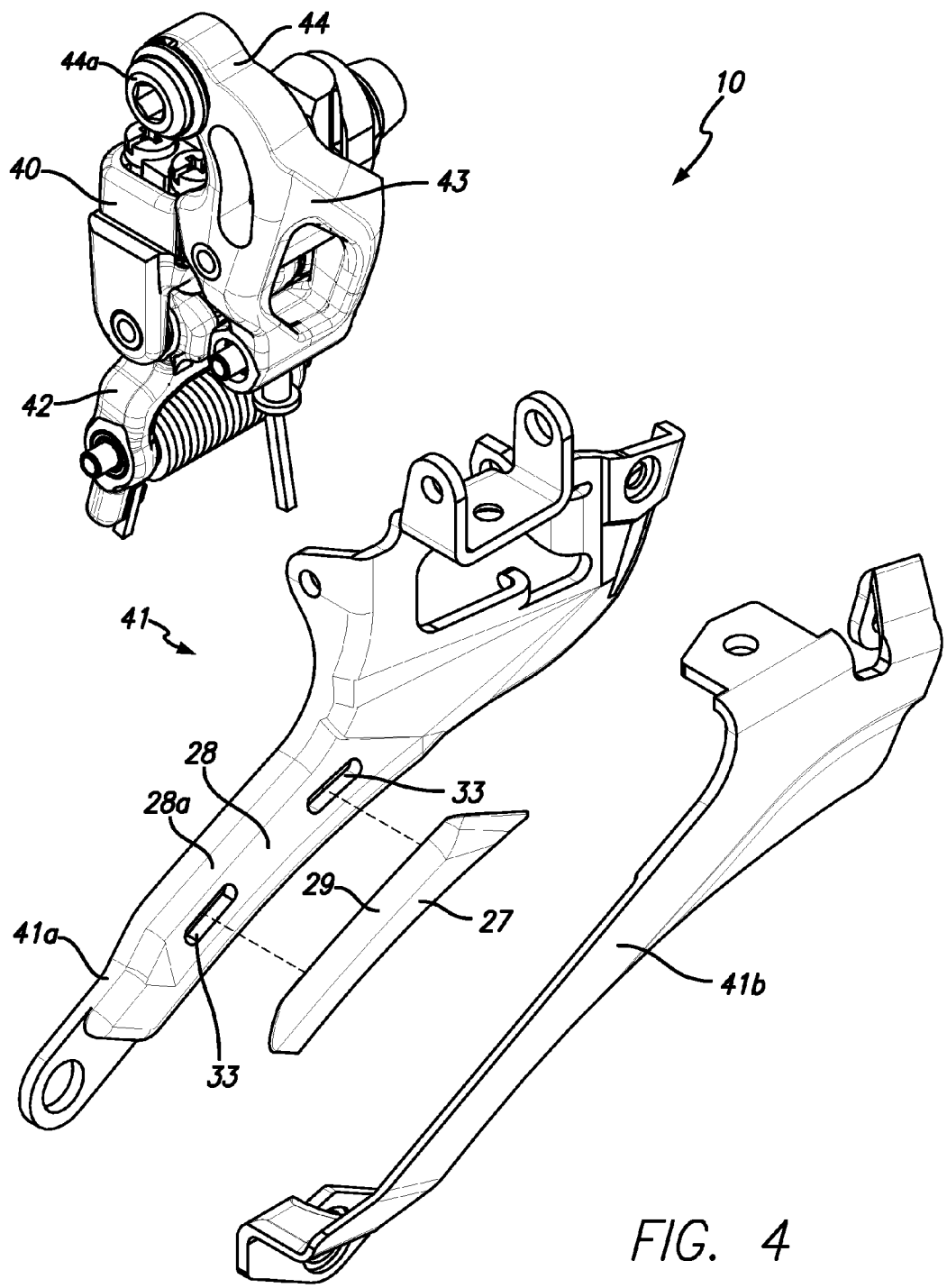
FIG. 4 is an exploded perspective view of the bicycle front derailleur of FIG. 1.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least me embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIGS. 1-5 show a front derailleur 10 that includes a chain guide 41 with a contact member 27.

As shown in FIG. 1, the front derailleur 10 is a downswing-type derailleur. However, the contact member 27 can be used with any type of derailleur. The front derailleur 10 preferably includes the main body 40, chain guide 41, a first or inner link 42 and a second or outer link 43. In an exemplary embodiment, the main body 40 is mounted on a seat tube of a bicycle frame 100 and the chain guide 41 is configured to move between a retracted position and an extended position relative to the main body 40.

The chain guide 41 guides the chain 95 (see FIG. 1) to either of at least two front chain rings by moving between two shift positions that include a low shift position disposed over the small diameter or inside chain ring, and a top shift position disposed over the large diameter or outside chain ring. The chain guide 41 is connected to the outer ends of the inner link 42 and the outer link 43 so as to move between the retracted position and the extended position relative to the main body 40. The inner link 42 and the outer link 43 are pivotally coupled at their inner ends to the main body 40 and pivotally coupled at their outer ends to the chain guide 41. The inner link 42 and the outer link 43 are arranged so as to be generally parallel to each other. Thus, the inner and outer links 42 and 43 form a four bar linkage assembly with the main body 40 and the chain guide 41 in order to move the chain guide 41 between the retracted position and the extended position. In a preferred embodiment, the chain guide 41 includes a first or inner plate 41a and a second or outer plate 41b that define a chain receiving slot therebetween. Preferably, the outer plate 41b is disposed on the outside (the side distant from the seat tube), and the inner plate 41a is disposed on the inside.

As shown in FIG. 1, the inner link 42 is disposed beneath the main body 40 in a state in which the main body 40 is mounted on the seat tube, and both ends of this link are connected to the main body 40 and chain guide 41 in a manner that allows the link to pivot freely. One end of the inner link 42 is connected to the main body 40 so that the inner link 42 can swing freely. The chain guide 41 is connected to the other end of the inner link 42 so that the chain guide can swing freely.

The outer link 43 is a link which is disposed generally parallel to the inner link 42 and in which both ends of the link are connected to the main body 40 and the chain guide 41 in positions that are more distant from the main body 40 than the inner link 42 is, so that outer link 43 can pivot freely. A cable anchoring arm 44 is connected to the outer link 43. A cable anchoring part 44a for bolting down the inner cable of the gear shift cable is disposed on the extended distal end of the cable anchoring arm 44.

As shown in FIG. 1, the contact member 27 is mounted on the inner plate 41a such that the chain 95 will contact the contact member 27 during a shifting operation and sometimes during riding. As shown in FIGS. 2 and 3, in a preferred embodiment, the inner plate 41a includes a recessed portion 28 in which the contact member 27 is seated and the contact member 27 includes a flexible portion 29 that is adapted to flex when contacted by the chain 95. In a preferred embodiment, the flexible portion 29 is spaced from the recessed portion 28 such that a gap 30 is defined therebetween. This gap 30 is provided so that when the flexible portion 29 is flexed by a chain the flexible portion 29 flexes or moves. It will be understood that the flexible portion 29 can move within a range, the end of which is contact with the recessed portion 28 of the inner plate 41a.

In a preferred embodiment, the contact member 27 includes a main body portion 31 with an upper surface 32 that has the flexible portion 29 extending upwardly therefrom. Preferably, the flexible portion 29 has an arcuate shape and the recessed portion 28 includes an arcuate portion 28a with an arcuate shape. With these shapes, when the flexible portion 29 is flexed by the chain 95, the inner surface of the flexible portion 29 contacts the arcuate portion 28a.

In a preferred embodiment, the flexible portion 29 has a proximal portion 29a and a distal portion 29b and the thickness of the proximal portion 29a differs from thickness of the distal portion 29b. Preferably, the thickness of the proximal portion 29a is thinner than the thickness of the distal portion 29b, as is shown in FIG. 3.

Figure 5:
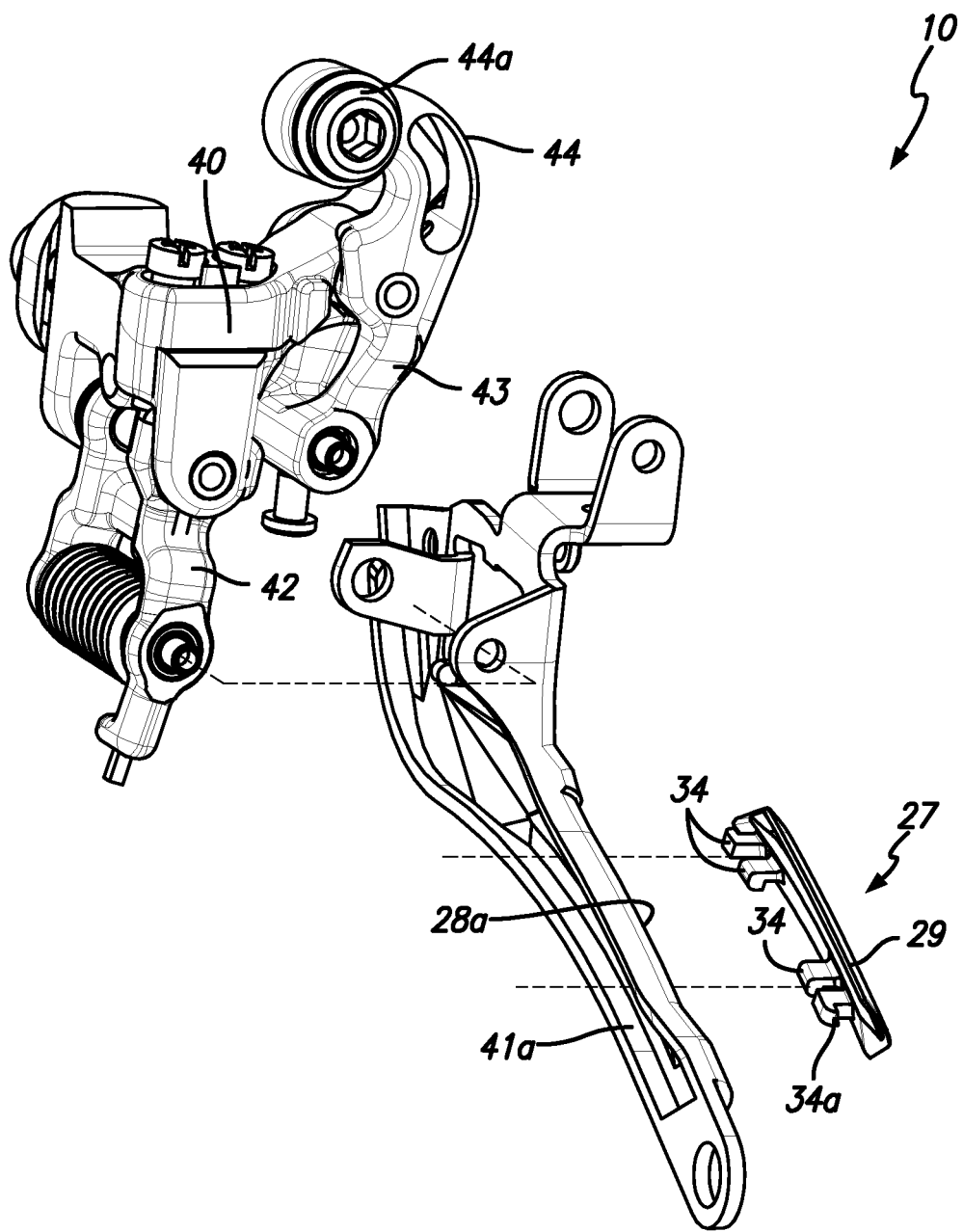
FIG. 5 is another exploded perspective view of the bicycle front derailleur of FIG. 1.

In a preferred embodiment, the contact member 27 is detachable from the inner plate 41a so that it can be replaced as desired. However, this is not a limitation on the present invention. In another embodiment, the contact member 27 can be permanently affixed to the inner plate 41a. To provide detachability, the inner plate 41a includes at least one securing opening 33 defined therein and the contact member 27 includes at least one securing member 34 extending therefrom that are detachably received in the securing openings 33. As shown in FIGS. 3 and 5, in a preferred embodiment, the securing members 34 can include securing hooks 34a thereon that are secured on the back surface of the inner plate 41a after the contact member 27 is positioned via snap fitting the securing members 34 in the securing openings 33. The hooks 34a can extend in any direction. In the embodiment shown in the figures, two extend outwardly and two extend downwardly. It will be understood that any number of securing members 34 are within the scope of the present invention. Moreover, any method for detachably securing the contact member 27 is within the scope of the present invention.

In use, when the chain 95 runs or rubs against the contact member 27, the flexible member 29 flexes, thereby reducing the amount of noise that would be made if the chain was running against the metal inner plate 41a. In a preferred embodiment, the contact member 27 is made of a resin or other plastic, which allows the flexible member 29 to flex and helps further reduce noise. In another embodiment, the outside plate 41b can also include a contact member.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A bicycle front derailleur comprising:
   a main body, and
   a chain guide operatively coupled to the main body, wherein the chain guide includes a first plate, a second plate, and a contact member affixed to the first plate, wherein the contact member includes a main body portion and a flexible portion extending upwardly from the main body portion when the bicycle front derailleur is mounted on a bicycle frame, wherein the main body portion is seated on the first plate and the flexible portion and the first plate include a gap therebetween, and wherein the flexible portion is adapted to flex with respect to the main body portion when contacted by a chain running through the chain guide, the gap being provided so that when the flexible portion is contacted by the chain the flexible portion flexes.

2. The bicycle front derailleur of claim 1 wherein the first plate and second plate are laterally disposed.

3. The bicycle front derailleur of claim 1 wherein the first plate is disposed closer to a bicycle frame than the second plate when the bicycle front derailleur is attached to the bicycle frame.

4. The bicycle front derailleur of claim 1 wherein the contact member is detachable from the first plate.

5. The bicycle front derailleur of claim 4 wherein the contact member includes at least one securing member extending therefrom, wherein the first plate includes at least one securing opening defined therein, and wherein the at least one securing member is detachably received in the at least one securing opening.

6. The bicycle front derailleur of claim 1 wherein the first plate includes a recessed portion in which the contact member is seated.

7. The bicycle front derailleur of claim 6 wherein the flexible portion comprises an arcuate shape.

8. The bicycle front derailleur of claim 7 wherein when the flexible portion is flexed by a chain the flexible portion contacts the first plate.

9. The bicycle front derailleur of claim 7 wherein the flexible portion includes a front surface and a back surface that each comprise an arcuate shape.

10. The bicycle front derailleur of claim 1 wherein the flexible portion has a proximal portion and a distal portion, and wherein the thickness of the proximal portion differs from the thickness of the distal portion.

11. The bicycle front derailleur of claim 10 wherein the thickness of the proximal portion is thinner than the thickness of the distal portion.

12. The bicycle front derailleur of claim 1 wherein the flexible portion extends upwardly from the main body portion.

13. The bicycle front derailleur of claim 12 wherein the flexible portion extends upwardly from an upper surface of the main body portion.

14. The bicycle front derailleur of claim 1 wherein the first and second plates include inner opposing surfaces, wherein the main body portion is in contact with the inner surface of the first plate, wherein the flexible portion extends upwardly from the main body portion, wherein the gap is defined between the flexible portion and the inner surface of the first plate, wherein a first distance is defined between the inner surface of the first plate and the main body portion and a second distance is defined between the inner surface of the first plate and the flexible portion, and wherein the second distance is greater than the first distance.

15. The bicycle front derailleur of claim 1 wherein the flexible portion extends upwardly from an upper surface of the main body portion.

16. The bicycle front derailleur of claim 15 wherein the flexible portion extends upwardly to or above an upper end of the first plate.

17. The bicycle front derailleur of claim 1 wherein the gap between the flexible portion and the first plate is larger than any gap between the main body portion and the first plate, thereby allowing the flexible portion to flex with respect to the main body portion when contacted by a chain running through the chain guide.

18. A bicycle front derailleur comprising:
a main body, and
a chain guide operatively coupled to the main body, wherein the chain guide includes a first plate, a second plate, and a contact member affixed to the first plate, wherein the contact member includes a main body portion and an arcuate shaped flexible portion extending from the main body portion, wherein the first plate includes a recessed portion in which the contact member is seated and the flexible portion and the first plate include a gap therebetween, and wherein the flexible portion is adapted to flex with respect to the main body portion when contacted by a chain running through the chain guide, wherein the first plate includes an arcuate surface adjacent the flexible portion, wherein the gap is defined between the flexible portion and the arcuate surface, whereby when the flexible portion is flexed by a chain with respect to the main body portion, at least a portion of the flexible portion contacts the arcuate surface.

19. The bicycle front derailleur of claim 18 wherein the first and second plates include inner opposing surfaces, wherein the main body portion is seated on the inner surface of the first plate, and the inner surface of the first plate comprises the arcuate surface.

20. The bicycle front derailleur of claim 18 wherein the arcuate surface comprises a convex shape.

* * * * *